Figure 1:
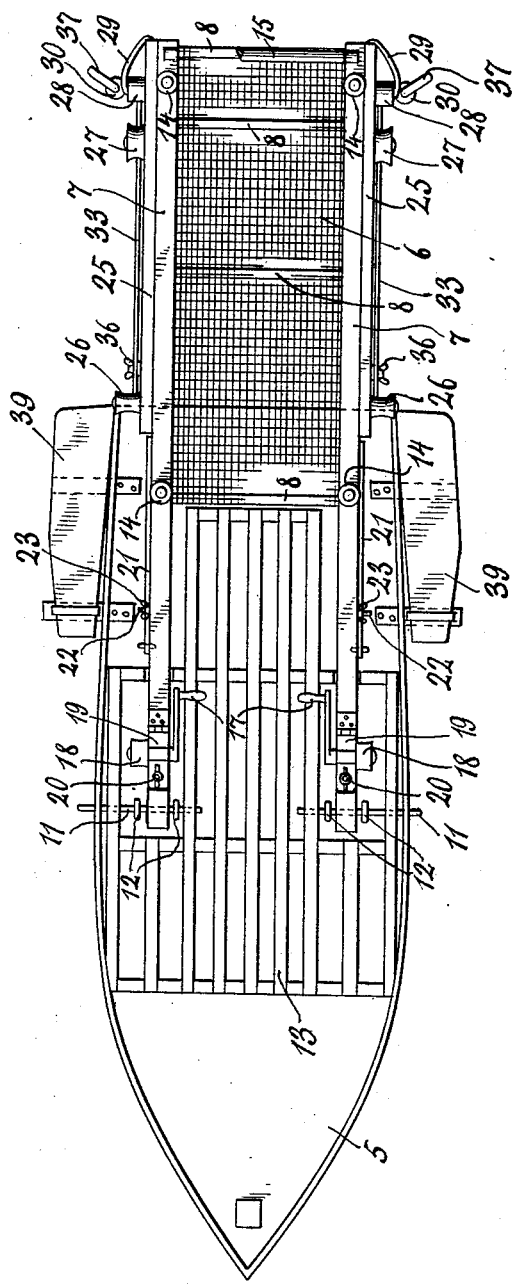

J. J. DUFFY.
APPARATUS FOR DELIVERING AND HAULING SEINES.
APPLICATION FILED JULY 25, 1911.

1,012,065.

Patented Dec. 19, 1911.
2 SHEETS—SHEET 1.

Witnesses
E. Larson
M. Schmidt

Inventor
John J. Duffy
By Milo B. Stevens & Co.
Attorneys

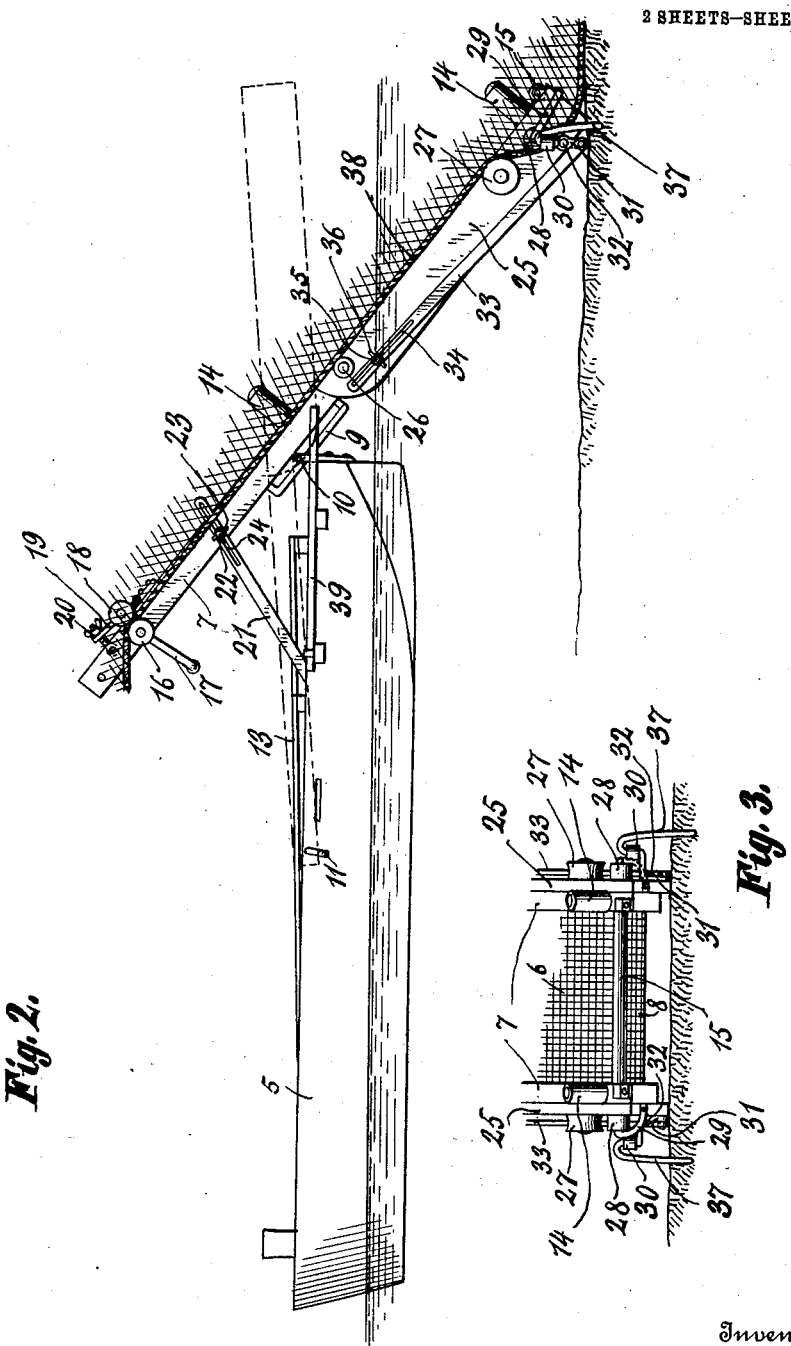

UNITED STATES PATENT OFFICE.

JOHN J. DUFFY, OF MATAGORDA, TEXAS.

APPARATUS FOR DELIVERING AND HAULING SEINES.

1,012,065.      Specification of Letters Patent.      Patented Dec. 19, 1911.

Application filed July 25, 1911. Serial No. 640,379.

*To all whom it may concern:*

Be it known that I, JOHN J. DUFFY, a citizen of the United States, residing at Matagorda, in the county of Matagorda and State of Texas, have invented certain new and useful Improvements in Apparatus for Delivering and Hauling Seines, of which the following is a specification.

This invention relates to apparatus for delivering seines into the water and for hauling the same, and its object is to provide an apparatus of this kind by which the seine can be readily delivered without danger of becoming entangled, and, furthermore, to provide an apparatus which enables the fishermen to keep the lead line on the bed of the bay, river or other body of water when hauling the seine, and thus prevent escape of the fish, and to do this without getting into the water, thereby escaping all danger of injury from sting-rays and other dangerous fish, as well as permitting hauls in water which is too deep for hauling the seine by hand.

With these objects in view, the invention consists in a novel construction and arrangement of parts to be hereinafter described and claimed, reference being had to the accompanying drawings, forming a part of this specification, in which drawings—

Figure 1 is a plan view of the apparatus. Fig. 2 is a side elevation of the apparatus showing the position of the parts when hauling in the seine. Fig. 3 is a front elevation of the lower end of the apparatus.

Referring specifically to the drawings, 5 denotes a barge, scow, or other water craft which carries the apparatus. Pivotally connected to the stern of the barge is a platform 6 of wire screening which is stretched between spaced longitudinal bars 7 connected at suitable intervals by cross braces 8. To the bottom of the bars, intermediate the ends thereof, are secured elongated eyes 9 which are engaged by staples 10 secured to the stern of the barge, whereby a pivotal support for the platform is had in order that it may be swung downwardly behind the stern of the barge into the water. When not in use, and also when the seine is being delivered into the water, the platform will be placed in elevated position as shown in Fig. 1, in which position it extends outwardly from the stern of the barge, and it is held in this position by pins 11 passing through staples 12 on the deck of the barge and eyes 12ª in the bars 7 near the inner ends thereof. The screening does not extend to the inner ends of the bars 7, thus leaving the space therebetween free. On the deck of the barge is a slatted platform 13 which is between the inner ends of the bars 7 when the platform 6 is swung out of the water and hauled on the deck of the barge, as shown in Fig. 1. The slatted platform is designed to hold the seine when it is not in use, in order that it may dry quickly.

On the bars 7 are upstanding guide rollers 14 and between said bars, at their outer ends, extends a transverse guide roller 15, whereby the seine is prevented from fouling as it is paying out upon being delivered into the water. The inner ends of the bars 7 carry each a winch 16 for hauling the seine. The winch may be operated by a hand crank 17, and opposite to its drum is located a roller 18 which is carried by a bearing 19 hinged to the bar so that the roller may be swung toward and from the periphery of the drum. A set screw 20 holds the bearing in adjusted position.

To the deck of the barge are pivoted slotted links 21. Bolts 22, provided with wing nuts 23, extend from the sides of the bars 7 and pass through the slots 24 of the links. This structure serves to hold the platform 6 after it has been swung into the water.

To the outer edges of the bars 7 are secured strips 25 which carry outstanding guide rollers 26 and 27, respectively, the former being located near the upper end and the latter near the lower end of the platform when the latter is swung into the water. Adjacent to the rollers 27 are rollers 28 from the axles of which extend guide rods 29, which latter curve rearwardly and terminate at the lower ends of the strips 25. Adjacent to the rollers 28 are rollers 30 which are carried by levers 31 pivoted at 32 to the strips 25. To the levers 31 are connected adjusting links 33 which are slotted as indicated at 34 to receive bolts 35 extending from the strips 25 and provided with wing nuts 36. These connections enable the rollers 30 to be adjusted relative to the rollers 28. From the axles of the rollers 30 extend guide rods 37, which latter curve outwardly and downwardly so that their lower ends may be stuck into the bed of the bay or other body of water.

In operation, one end of the seine is dropped into the water and is picked up by the crew of a motor or other boat and carried around the school of fish, the seine paying out without fouling between the upright rollers 14. When the seine has all been paid out, the motor boat having the loose end of the seine, surrounds the fish and returns to the barge. The lead line 38 on each end of the seine is then placed between the rollers 28 and 30 and also passed over the roller 27. The rollers 30 are tightened up by means of the links 33. The pins 11 are now removed and the platform 6 is lowered into the water until the lower end of the platform rests on the bottom. The lead lines 38 are now carried to the winches 16 and by means of the hand cranks 17, the seine is hauled in until the sack is reached. The platform is then elevated to the position shown by dotted lines in Fig. 2. The fish remaining in the sack are then brought on board, or left in the sack to be taken out later.

On the sides of the barge, at the stern, are removable platforms 39 which are used as running boards for two men, one on each side of the seine, so that they may handle the cork line of the seine and prevent the same from fouling or becoming tangled, as well as to see that all the fish are either brought on board with the web of the seine, or left in the sack to be taken out later.

The apparatus is practical, and has been successfully operated in rough and smooth water and in varying depths, and it catches the fish in places where it would be impossible to make a haul by hand.

It will be noted that the rods 29 and 37 guide the lead line between the rollers 28 and 30 and also hold it down to the bed, and the seine is also prevented from fouling on the end of the bars 7 and strips 25 so that the fish are effectually prevented from escaping. The rollers 30 are adjusted just tight enough to prevent the lead line from slipping out between the two rollers, but not tight enough to prevent the web of the seine from passing between. The guide rollers 27 and 26 hold the lead line close to the strips 25.

The preferred embodiment of the invention has been shown, but it will be understood that various changes in the structural details, within the scope of the invention, may be resorted to.

I claim:

1. In a seining apparatus, a support, a platform carried by the support and adapted to be extended into the water, guide rollers on the sides of the platform at the lower end thereof, tension rollers coöperating with said guide rollers, guide rods extending from the axles of the rollers for directing the seine between said rollers, one of said guide rods extending downwardly, and hauling devices carried by the platform.

2. In a seining apparatus, a support, a platform carried by the support and adapted to be extended into the water, said platform having elongated eyes and the support having staples passing through the eyes, and seine guides on the platform.

3. In a seining apparatus, a support, a pivoted platform carried thereby and adapted to be lowered into the water, links pivoted to the support, and adjustably connected to the platform, and seine guides on the platform.

In testimony whereof I affix my signature in presence of two witnesses.

JOHN J. DUFFY.

Witnesses:
A. W. McNabb,
Goodwin Sterne.

---

Copies of this patent may be obtained for five cents each, by addressing the "Commissioner of Patents, Washington, D. C."